United States Patent
Fernald et al.

(10) Patent No.: US 8,289,010 B1
(45) Date of Patent: Oct. 16, 2012

(54) METHOD FOR CONTROL OF OVERLAP TIMES IN SWITCHING POWER CONVERTERS

(75) Inventors: Kenneth W. Fernald, Austin, TX (US); Milton Martin Hood, Jr., Austin, TX (US); Kris P. Dehnel, Cedar Park, TX (US); Aaron Michael Shreeve, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 1924 days.

(21) Appl. No.: 11/429,484

(22) Filed: May 5, 2006

Related U.S. Application Data (60) Provisional application No. 60/723,282, filed on Oct. 3, 2005.

(51) Int. Cl.
*G05F 1/00* (2006.01)
(52) U.S. Cl. .......................... 323/283; 323/280; 323/282
(58) Field of Classification Search .................. 323/280, 323/282, 283
See application file for complete search history.

(56) References Cited

U.S. PATENT DOCUMENTS

| | | | |
|---|---|---|---|
| 6,198,263 B1 | 3/2001 | Chan | |
| 6,294,954 B1 | 9/2001 | Melanson | |
| 6,351,396 B1 * | 2/2002 | Jacobs | 363/21.06 |
| 6,614,208 B2 * | 9/2003 | Narita | 323/283 |
| 6,960,904 B2 * | 11/2005 | Matsuura et al. | 323/283 |
| 7,057,380 B2 | 6/2006 | Kuo et al. | |
| 7,176,743 B2 * | 2/2007 | Leonowich et al. | 327/423 |
| 7,656,142 B2 * | 2/2010 | Liao | 323/288 |
| 2004/0108844 A1 * | 6/2004 | Stanescu et al. | 323/298 |
| 2005/0184716 A1 * | 8/2005 | Brown | 323/283 |
| 2005/0275354 A1 * | 12/2005 | Hausman et al. | 315/291 |
| 2005/0275392 A1 * | 12/2005 | Wong et al. | 323/283 |
| 2006/0152204 A1 | 7/2006 | Maksimovic et al. | |

* cited by examiner

*Primary Examiner* — Adolf Berhane
*Assistant Examiner* — Gary Nash
(74) *Attorney, Agent, or Firm* — Meyertons Hood Kivlin Kowert & Goetzel, P.C.; Jeffrey C. Hood (57) ABSTRACT

Embodiments of a system and method to control the overlap times—and deadtime delays—in power converters may support both overlapping and non-overlapping gate control signals, which may provide improved efficiency optimization across a wider range of applications. Various embodiments may be configured to provide careful partitioning between hardware implementation and software control, in order to better accommodate microprocessor-based power converters. Software algorithms may be used to avoid restrictions such as high gate impedance and changing load effects, and protection against errant operation may be provided using an overlap watchdog circuit. Various control circuits may be operated according to one or more algorithms configured to optimize both the HS-to-LS and LS-to-HS deadtime delays for obtaining minimum possible PWM duty cycle values to achieve improved power efficiency.

26 Claims, 10 Drawing Sheets

FIG. 21

METHOD FOR CONTROL OF OVERLAP TIMES IN SWITCHING POWER CONVERTERS

This application claims benefit of priority of U.S. provisional application Ser. No. 60/723,282 titled "System and Method for Implementing Distributed Power Management", filed Oct. 3, 2005.

BACKGROUND OF THE INVENTION

1. Field of the Invention

This invention relates to power converters and, more particularly, to incorporating power-management functions in power converters.

2. Description of the Related Art

From 1995 to 2001, the highest density processors from manufacturers such as Intel went from a power consumption rate of about 30 Watts at 3.3 V to a power consumption rate of about 90 Watts delivered at 1.5 V. A simple application of the power-voltage-current relationship reveals that the total current consumed by these chips has increased from nine amps to about 60 amps in a very short time period. There are similar analogies with all larger digital integrated circuits (ICs).

This rapid evolution has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 m$\Omega$ resistance at 60 Amps).

Figure 1:
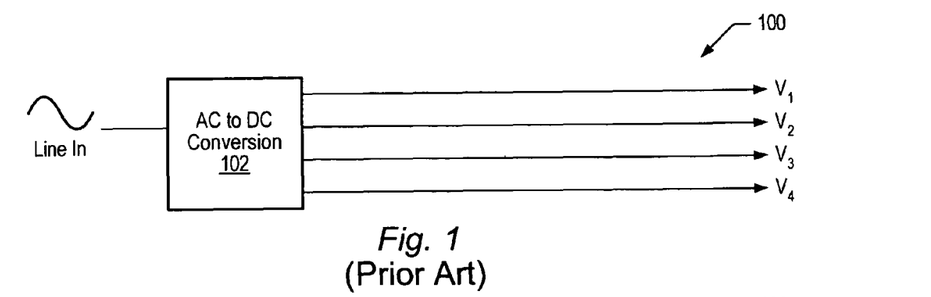
FIG. 1 shows a power distribution circuit, according to prior art.

Traditionally, DC power supplies were designed to convert AC line voltage to one or more DC outputs that would be routed throughout a system to the points of load (POL). FIG. 1 is an illustration of a prior art power distribution system. As shown in FIG. 1, a power distribution scheme 100 may comprise an AC to DC converter 102 generating output voltages V1, V2, V3, and V4 that may be distributed to various point of load devices (POLs). However, it may not be practical to route high-current signals throughout a system.

Figure 2:
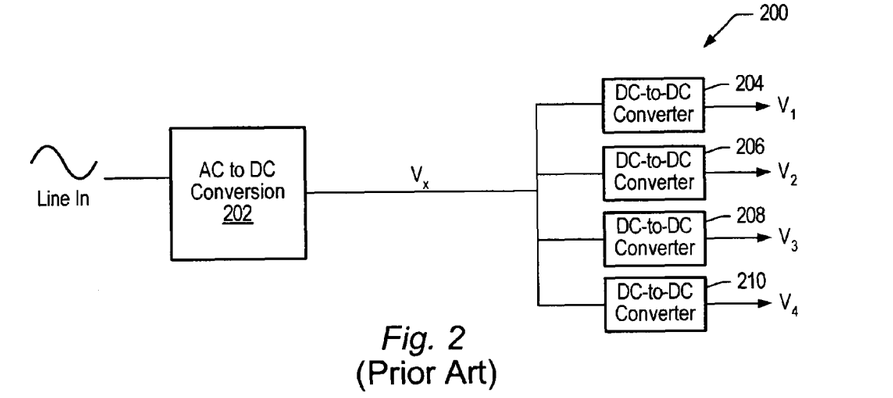
FIG. 2 shows a distributed power architecture (DPA), according to prior art.

To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA, and is illustrated in FIG. 2. As shown in DPA system 200 of FIG. 2, an AC to DC voltage converter 202 may produce an intermediate DC voltage Vx, which may be routed to individual local DC to DC converters 204, 206, 208, and 210, which in turn may provide the required DC voltages V1, V2, V3, and V4, respectively, to their corresponding POLs. With a DPA, errors may be reduced since the distance traveled by a high-current signal is minimized, thus reducing I×R (resistive) and L di/dt (inductive) errors.

In many power distribution systems it is typically not enough to just distribute power around a system to the various POLs. Complex electronic systems are generally monitored and controlled to ensure maximum reliability and performance. Functions (power supply features) typically implemented in DPA systems are listed below.

Supply Sequencing

A modern electronic system can contain many ICs and each IC can have several supply voltage requirements. For example, core logic may require one voltage and the I/O may require a different voltage. This typically results in a need for setting the order in which the voltages on a single chip are applied and the order in which the chips in a system are powered up.

Hot Swap

Many electronic systems, including computers, telecom racks, storage devices and battery-operated devices require "hot swap" capability. Hot swap capability typically comprises the live attachment of a device to power, i.e., attaching a device to a system that is powered up (without having to power down the system prior to the attachment). Examples of hot swap events may include installing a battery in a PDA or plugging a USB device into a computer.

Ramp Control

It is sometimes necessary to control the rate at which the DC output voltage of a converter ramps from its initial value to its nominal value. This may be done in support of managing a hot-swap event, sequencing requirement or satisfying the requirements of the load.

Voltage Programming

The final voltage presented to a load may need to be programmed to the desired value or may need to be "trimmed" to a precise value. Some systems require active voltage programming of devices during their use.

Load Monitoring

In order to maintain high reliability of an electronic system, monitoring of load status is sometimes required. Both current and voltage may need to be monitored and action may need to be taken based on the load status measurements. Current and voltage may also need to be monitored for undershoot and overshoot conditions. In some systems, when an error is detected, the system may take corrective action by switching the load off, isolating the load or just setting a system flag.

Tracking

Many times it is desirable to have the output of one more converters follow, or mirror, the output of one or more other converters in the system. Tracking a specific voltage level, for example, may include setting the voltage level of a tracking converter or device to the voltage level of a tracked converter or device, and changing the voltage level of the tracking device to match the voltage level of the tracked device any time the voltage level of the tracked device changes. In some cases the voltage levels of tracking devices and tracked devices may not be the same; changes in the tracked voltage level would simply be mirrored in the voltage output of the tracking devices. For example, if the tracked voltage increases by 0.2V, the tracking voltage would also increase by 0.2V.

Temperature Monitoring

Dense electronic systems often generate excessive waste heat. The excessive heat generally needs to be removed in order to keep the electronics operating at their safe operating temperature. Therefore, the temperature of individual loads as well as the temperature of various locations within the system's enclosure is typically monitored. When temperatures reach unacceptable limits, action may need to be taken locally and/or at the system level. Such corrective actions often include turning on or speeding up fans, setting an alarm or simply shutting down the power to the problematic load. Temperatures can be measured using several methods. Some large digital processors sometimes incorporate embedded temperature sensor diodes on chip. Other systems may employ thermistors and IC temperature sensors.

Fan Speed Control

In conjunction with temperature monitoring it is often necessary to monitor and control fan speed. This may be done to control airflow or to control acoustic noise.

Phase Control

DC voltage is typically stepped down in one of two ways, linear regulation and DC-to-DC conversion. DC-to-DC converters may step down DC voltage by pulse width modulation (PWM) of an input voltage and passive filtering of the output. The duty cycle of the PWM signal generally approximates the ratio of output voltage to input voltage divided by the efficiency of the converter. For example, for an ideal DC-to-DC converter with a desired output of 1.2V and an input of 12V, the duty cycle would be 10%. In high current applications, it is often desirable to force the various DC-to-DC converters to sample different "phases" of their clock cycle. That is, to prevent DC-to-DC converters in a system from all sampling the first 10% of a clock cycle, one converter may sample the first 10% of the clock cycle and the next converter may sample a different 10% of the clock cycle, and so on. This typically reduces noise and improves transient response. This technique is also used in motor control and is often implemented to control multiple fans in a system. PWM controlled fans with staggered phase typically offer reduced acoustic noise.

Current Sharing

In addition to forcing DC-to-DC converters to sample staggered phases of the switching clock, it is sometimes desirable to force two or more independent converters to each deliver an equal share of the load current. This approach provides improved noise and transient response in high-current applications.

Programmable Switching Frequency

Certain DC-to-DC converters feature programmable switch frequencies. Frequencies may be selected based on several system concerns.

Synchronization of Switching Clocks

It is often desirable to synchronize the switching frequency of DC-to-DC converters in a system to each other or to some other system clock. This is typically performed to reduce the probability of mixing the clock or its harmonics with important system clocks. It is of particular interest in communication applications.

There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement gluelogic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system.

Figure 3:
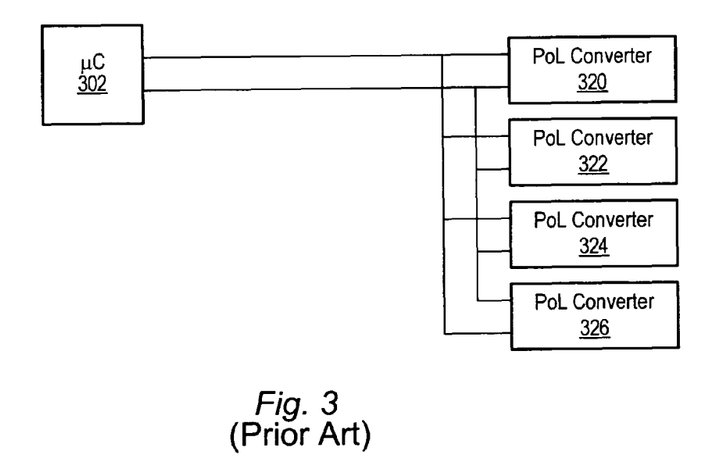
FIG. 3 shows system in which a microcontroller communicates with POL converter devices over an I²C bus, according to prior art.

In an effort to tie all or most of these functions together at the system level, one approach has been to implement the functions in control ICs responsible for controlling respective POL converters. Some of the functionality may also be programmed into a microcontroller that may communicate with attached POL converters over an I2C (inter-IC communication) bus to coordinate control of all POL converters in the system. FIG. 3 illustrates an example of an I2C-based system. As shown in FIG. 3, a microcontroller 302 may be coupled to POL converters 320, 322, 324, and 326, with the connections between the devices representing an I2C bus. A configuration as shown in FIG. 3 is typically not suited for active control and is used mainly for status monitoring, where POL converters 320, 322, 324, and 326 may send a status signal back to microcontroller 302, which in turn may send a simple control signal to a respective POL converter based on the status information received from the respective POL converter. In general, microcontroller 302 checks status for one POL converter at a time, which may be viewed as a disadvantage when more interactive, real-time communication is desired in a system.

Figure 4:
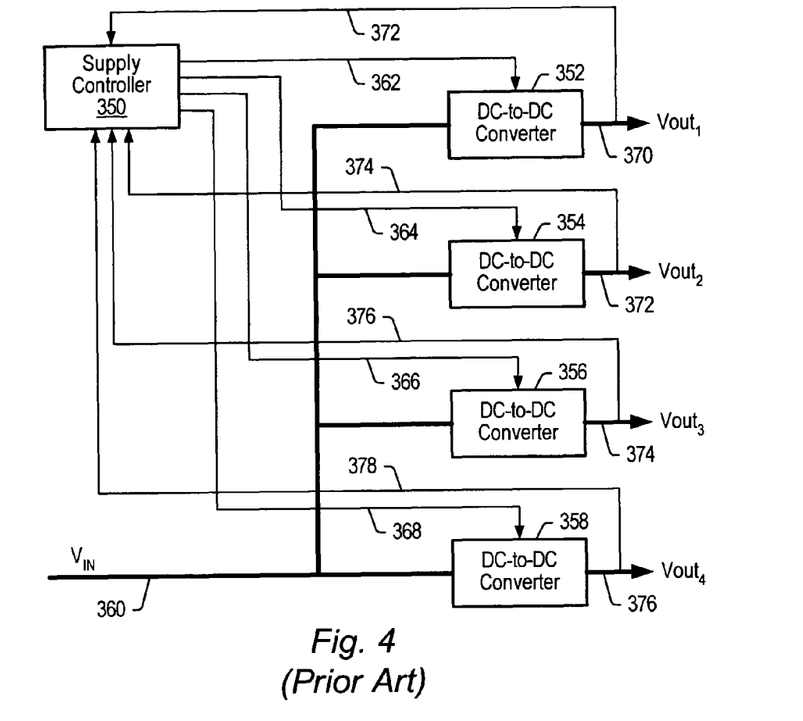
FIG. 4 shows system in which DC-to-DC voltage converters are interconnected in a point-to-point configuration, controlled by a central supply controller to perform a specific function, according to prior art.

FIG. 4 illustrates one example of a single function implemented in a DPA system. Typically, a supply controller 350 (providing control for executing the function) and DC-to-DC voltage converters 352, 354, 356, and 358 are connected in a point-to-point configuration as shown. Supply controller 350 is coupled to each DC-to-DC converter over dedicated lines, (typically analog lines are used for implementing most functions), more specifically over lines 372 and 362 to converter 352, lines 374 and 364 to converter 354, lines 376 and 366 to converter 356, and lines 378 and 368 to converter 358. Input supply voltage VIN 360 is coupled to each DC-to-DC converter, and in turn DC-to-DC converter 352 may produce, for a respective POL or POLs, DC output voltage 370, DC-to-DC converter 354 may produce DC output voltage 372, DC-to-DC converter 356 may produce DC output voltage 374, and DC-to-DC converter 358 may produce DC output voltage 376.

Figure 5:
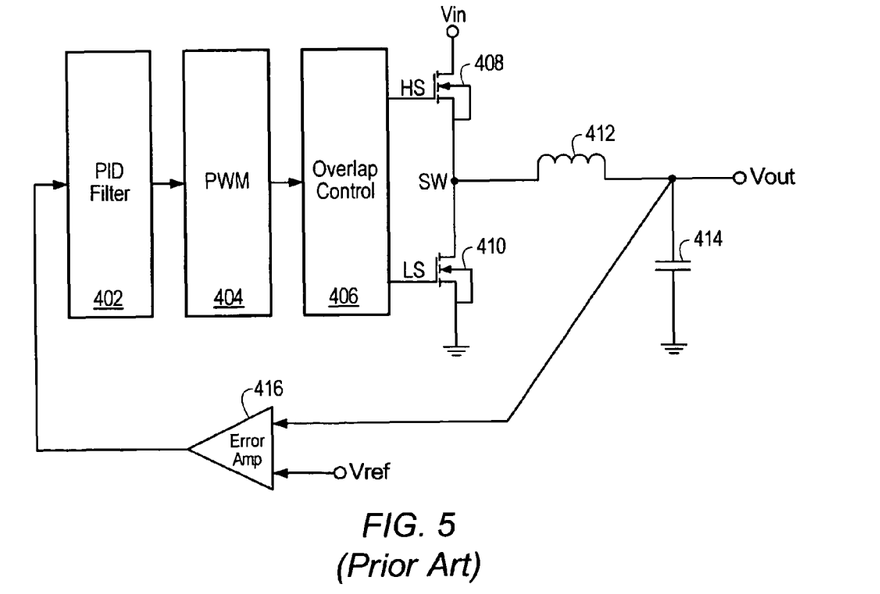
FIG. 5 shows a circuit diagram of a "Buck style" switching converter, according to prior art.

DC-to-DC conversion is often performed by switching power regulators, or step-down regulators, converting a higher voltage (e.g. 12V) to a lower value as required by one or more load devices. A common architecture features distribution of the higher voltage to multiple power regulators, each producing a different (or possibly the same) voltage to one or more loads. Switching power regulators often use two or more power transistors to convert energy at one voltage to another voltage. One common example of such a power regulator, commonly called a "Buck Regulator" is shown in FIG. 5. A Buck Regulator typically switches a pair of power transistors (408 and 410) in order to produce a square-wave at their common node SW. The produced square-wave can be smoothed out using an LC circuit comprising inductor 412 and capacitor 414 to produce the desired voltage, Vout. A control loop, comprised of an Error Amplifier 416, a Proportional-Integral-Differential (PID) Filter 402, a Pulse-Width-Modulator (PWM) 404, and an Overlap Control circuit 406, can be configured to control the duty-cycle of the output square-wave, and hence the resulting value of Vout. In general, transistors 408 and 410 are controlled such that they do not conduct current at the same time. Typically, when transistor 408 is turned on (HS is asserted), transistor 410 is turned off (LS is de-asserted). However, depending on the details of the power stage and its load, the efficiency of the regulator can be improved by careful control of the relationship between the two gate control signals, HS and LS.

Figure 6:
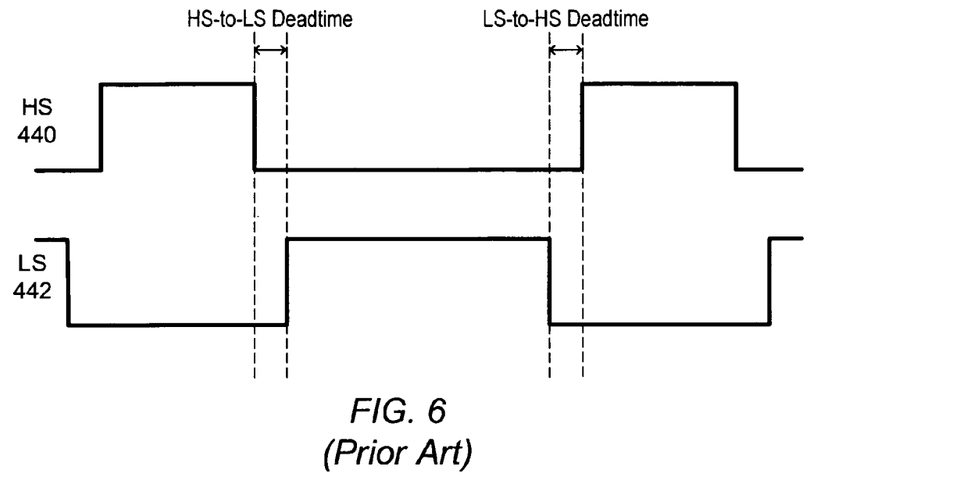
FIG. 6 shows a timing circuit for the switching converter of FIG. 5, according to prior art.

FIG. 6 illustrates a simple timing diagram for a Buck Regulator, such as the regulator shown in FIG. 5. As shown in FIG. 6, a brief "deadtime" is generated between transistor 408 being disabled—shown as HS signal 440 de-asserting from a high value to a low value—and transistor 410 being enabled—shown as LS signal 442 asserting from a low value to a high value. The period during which both devices are turned off generally eliminates the possibility of their conducting current directly from the input to ground. If the deadtime is too short, such cross-conduction could waste power. However, if the deadtime is too long, the body-diode of transistor 410 may conduct current, and may thus also waste power. One aspect of deadtime control is the optimization of the timing to obtain greater efficiency, that is, the highest possible ratio of the output power to the input power ($P_{out}/P_{in}$). Depending on the specifics of any given design, the optimal deadtime could require that the gate control signals slightly overlap.

Figure 7:
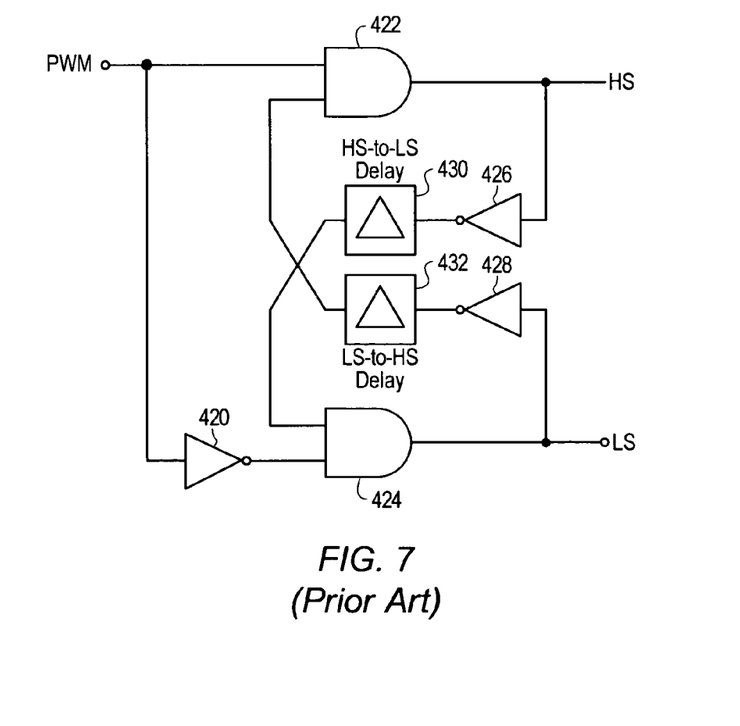
FIG. 7 shows a simple detection circuit configured to determine when a transistor in a switching power converter has been disabled, according to prior art.

One common method for controlling the deadtime in power converters includes using a simple detection circuit for determining when a transistor has been disabled. One example of a simple detection circuit—which is also often used to allow the other transistor to enable—is shown in FIG. 7. The input to the circuit may be a control signal generated by PWM circuit 404. When the PWM signal is asserted (in this case having a high value), transistor 408 may be expected to enable. However, the circuit generally inhibits transistor 408 until transistor 410 has responded to the PWM signal, to turn-off. More specifically, a gate control signal is not asserted until the opposite gate control signal has been de-asserted. This typically guarantees that the two gate control signals (HS and LS) will never overlap. The deadtime, that is, the length of time during which both control signals HS and LS are de-asserted, is controlled by delay cells 430 and 432. Often implemented as a series of logic gates, delays 430 and 432 can generally be controlled to tune the desired deadtime. However, since only the command gate control signal is detected, the actual transistor response for a transistor having significant gate impedance can lag behind the gate signal, and hence shorten the actual deadtime. Several methods to solve this problem have been implemented. Some circuits use additional package pins to allow a direct connection to the transistor gate in order to provide a sense path for the circuits. While this may help solve driver and board impedance issues, it does not address the issue of the transistor gate impedance. Another technique includes measuring the current being supplied by the HS and LS driver outputs as they charge the transistor gates. When the current approaches zero, it may be taken as an indication that a given transistor has responded to the gate control, and the other transistor may then be allowed to change state.

Many other problems and disadvantages of the prior art will become apparent to one skilled in the art after comparing such prior art with the present invention as described herein.

SUMMARY OF THE INVENTION

One aspect of the present invention is the control of overlap times—and therefore the deadtimes—associated with transistor gate control signals in switching power converters. One set of embodiments support both overlapping and non-overlapping gate control signals, thereby providing improved efficiency optimization across a wider range of applications. Various embodiments may also be configured to provide partitioning between hardware implementation and software control in order to best accommodate microprocessor-based power converters. Software algorithms may be used to avoid restrictions such as high gate impedance and changing load effects, and protection against errant operation may be provided using an overlap watchdog circuit. Finally, an algorithm may be devised to optimize both the HS-to-LS and LS-to-HS deadtime delays.

In one set of embodiments, a deadtime control circuit for controlling the desired time delays between two PWM (Pulse Width Modulated) signal based gate control signals used for controlling the output transistors of a switching power regulator may include a microcontroller, an integrator, and an overlap control circuit. The microcontroller may receive an average duty-cycle value of the PWM signal, which may be computed over a specified period of time by the integrator. The microcontroller may be configured to determine optimal delay settings based on the average PWM duty-cycle value, and may set, based on the determined optimal delay settings, the desired time delays in the overlap control circuit. The overlap control circuit may then produce the desired time delays based on the optimal delay settings, and assert the two gate control signals according to the desired time delays applied to the PWM signal.

In one embodiment, the microcontroller executes an algorithm configured to determine the delay settings based on maximizing efficiency by minimizing the current pulled from the input voltage applied to the top output transistor, while the voltage regulator maintains the desired output voltage. Since the average current drawn from the input is directly related to the duty-cycle of the PWM signal, minimizing the duty-cycle while maintaining the output voltage may lead to the input power being minimized, resulting in maximized efficiency for the converter. The approximate duty-cycle required for maintaining the output voltage may be defined as the ratio of the output voltage of the switching power regulator over the input voltage to the switching power regulator.

In one set of embodiments, the overlap control circuit includes a first delay and a second delay element. The first delay element may be configured to receive a set-delay value provided by the microcontroller, as well as the PWM signal. The first delay element may delay the PWM signal by a first time period determined according to the set-delay value, thereby producing a once delayed PWM signal. The second delay element may also be configured to receive the set-delay value, as well as the once delayed PWM signal, and further delay the once delayed PWM signal by a second time period determined according to the set-delay value, thereby producing a twice delayed PWM signal. The overlap control circuit may selectively output either the PWM signal or the once delayed PWM signal or the twice delayed PWM signal as the gate control signal for the top output transistor.

The overlap control circuit may further include gate logic to generate a first intermediate control signal and a second intermediate control signal based on the PWM signal, the once delayed PWM signal, the twice delayed PWM signal, and first, second, and third control values also received from the microcontroller. Various different combinations of the first, second, and third control values may be generated by the microcontroller to control respective desired corresponding overlapping characteristics of the two gate control signals. The overlap control circuit may then output either the first intermediate control signal or the second intermediate control signal as the gate control signal for the bottom output transistor.

In some embodiments, the overlap control circuit may also include a third delay element configured to delay the PWM signal by a third time period determined based on the set-delay value, thereby producing an alternate delayed PWM signal. Additional logic may be configured within the overlap control circuit to generate the first intermediate control signal and the second intermediate control signal based on the alternate delayed PWM signal, the once delayed PWM signal, the twice delayed PWM signal, and the first, second, and third control values received from the microcontroller. The first delay element may be controlled to provide a delay equal to the largest delay value (from the gate control signal of the bottom output transistor to the gate control signal of the top output transistor) required for a given application. After the first delay element has been set, it may remain unchanged during subsequent deadtime optimization, while the second and third delay elements may be allowed to change.

The deadtime control circuit may also include an overlap watchdog circuit configured to receive the two gate control signals and disable the gate control signal for the top output transistor after both gate control signals have been simultaneously asserted for a certain period of time.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

The following references are hereby incorporated by reference in their entirety as though fully and completely set forth herein:

U.S. Patent Application Publication No. 2004/0201279 (Ser. No. 10/820,976), titled "Method And Apparatus For Improved DC Power Delivery, Management And Configuration," filed Jun. 21, 2004.

U.S. patent application Ser. No. 11/198,698, titled "Method For Using a Multi-Master Multi-Slave Bus For Power Management," filed Aug. 5, 2005.

Figure 8:
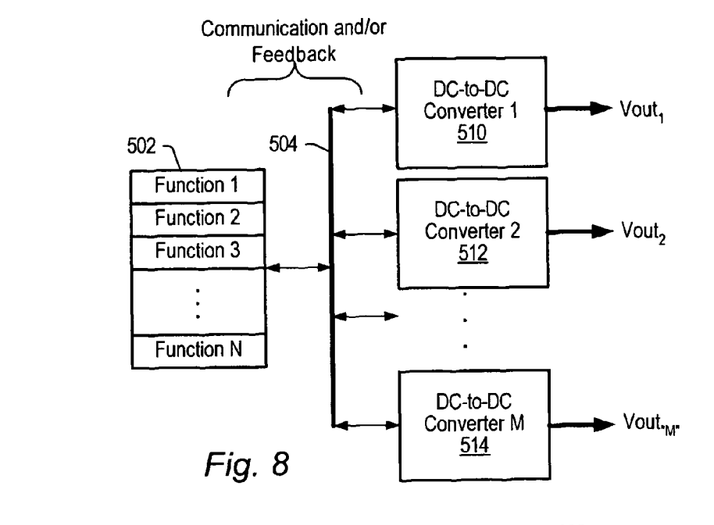
FIG. 8 shows an embodiment of the system of the present invention for improved DC power delivery, management and configuration.

FIG. 8 is a block diagram of one embodiment of a power distribution system. As shown, the common functions required in a complex DC power system may be combined in a single controller rather than treated as separate IC functions. As illustrated in the embodiment of FIG. 8, a controller 502 managing functions 1 through N may be coupled to DC-to-DC converters 1 through M (illustrated by example as power converters 510, 512 and 514) via a digital bus 504. Digital bus 504 may be a serial bus enabling communication with reduced wiring requirements. In the configuration shown in FIG. 8, real-time communication is made possible between power converters 510, 512, and 514 and controller 502 by their being coupled to serial digital bus 504. It is noted, however, that in other embodiments the power converters may communicate with the controller 502 and with each other by other means, e.g., a parallel bus.

Figure 9:
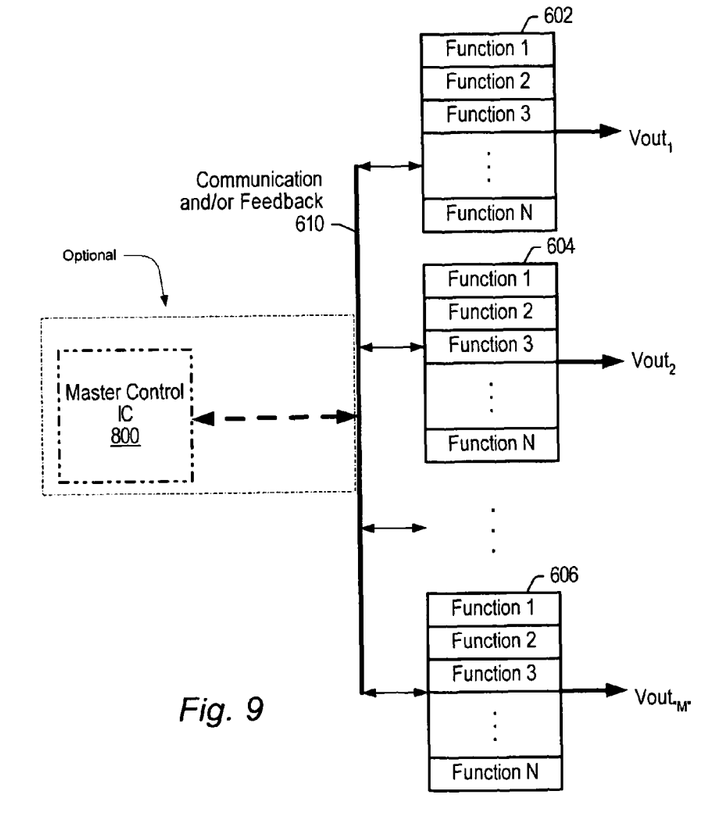
FIG. 9 shows the interconnection of digital power management devices (DPMDs) according to one embodiment of the present invention.

The illustrated embodiment of FIG. 9 provides a system-oriented solution using mixed-signal IC technology, allocating one unit of each function to a single point of load (POL) IC, or digital power management device (DPMD). In this embodiment, one DC-to-DC voltage converter, one unit of supply sequencing, one unit of load monitoring, and one respective unit of various other functions (previously discussed) are combined in each DPMD, e.g., in each of DPMD 602, DPMD 604, and DPMD 606.

As illustrated in the embodiment of FIG. 9, DPMDs 602, 604, and 606 have each been allocated Functions 1 through N, and are coupled together via serial digital bus 610. Bus 610 may be simpler than an I2C bus and may offer more control and signaling, including real-time data feedback capability. Bus 610 may also allow each DPMD to be coupled to a master control IC (MCIC) 800, or to be coupled only to each other, enabling all system level functions to be configured, controlled and monitored providing simple and flexible results. MCIC 800 is shown mostly for illustrative purposes, and preferred embodiments may omit MCIC 800 and only include DPMDs coupled to bus 610, where all required functions may be controlled by a single DPMD or a group of DPMDs operating together. By configuring each POL device or DPMD to have the ability to communicate with any other POL device or DPMD coupled to bus 610, each POL device or DPMD may act as either a master or a slave on bus 610, thereby obviating the need for MCIC 800 where it may be desirable to design a power delivery system without MCIC 800, or without any other similar central control unit.

Various embodiments, as illustrated in FIG. 9, provide a modular approach to designing DPA systems, providing system level functionality without requiring the system to be individually and separately configured for each desired function that may be required. Each DPMD may be individually configured prior to its being placed in the system, and may operate to perform all necessary functions by having access to real-time feedback information over bus 610, and by communicating with other DPMDs. This represents active control as opposed to simple status monitoring. Several devices may be enabled when the DPA system is configured as illustrated in the embodiment FIG. 6. Rather than just having a DC-to-DC converter, a DPMD may comprise a DC-to-DC converter, and any or all of the associated control, configuration and monitoring functions associated with a single node.

As previously mentioned, the DC-to-DC conversion may be performed by a switching power regulator using two or more power transistors, which may operate to convert energy at one voltage to another voltage. One such power regulator, a Buck Regulator, was shown in FIG. 5. Issues associated with the deadtime when both transistors in the Buck Regulator are turned off have also been previously discussed. One important aspect of controlling deadtimes is how the actual deadtime delays are selected, or tuned. In some embodiments, a fixed delay, measured in nanoseconds, may be used. In other embodiments, the delays may be tuned to optimize efficiency. In yet other embodiments, a running average of the duty-cycle of the PWM signal may be monitored to determine the deadtime delay values that may minimize the running average. However, by optimizing only one delay at a time, there may be no continual correction for variations that may occur due to temperature, input or load changes. In addition, it may not be possible to avoid settling on non-optimal deadtime values due to local minimums in the duty-cycle vs. deadtime relationship of a given application.

It is one aspect of the present invention to control the overlap times—and consequently the deadtimes—in the power converters. One set of embodiments support both overlapping and non-overlapping of the gate control signals, which may provide improved efficiency optimization across a wider range of applications. Various embodiments may also be configured to provide careful partitioning between hardware implementation and software control, in order to be better suited for microprocessor-based power converters. Software algorithms may be used to avoid restrictions such as high gate impedance and changing load effects, and protection against errant operation may be provided using an overlap watchdog circuit. Finally, an algorithm may be devised to optimize both the HS-to-LS and LS-to-HS deadtime delays.

Figure 10:
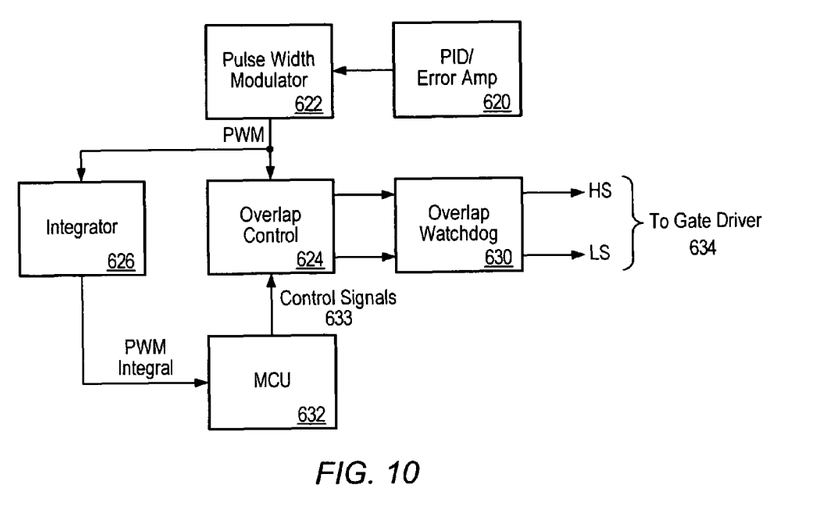
FIG. 10 shows one embodiment of a deadtime control system.

A diagram for one embodiment of a deadtime control system is shown in FIG. 10. An Overlap Control block 624 may be configured as the central operating unit, which may perform the primary functions of generating the desired deadtime delays between the HS and LS gate control signals. The delays generated by Overlap Control block 624 may be controlled, and/or set via control signals 633 according to an algorithm, which may be a software algorithm executed by an on-chip microcontroller unit (MCU) 632. In alternate embodiments, the algorithm may be executed by an alternate device(s) other than a microcontroller. Alternate devices may include any of a number of circuits and/or devices configurable and/or adapted to execute algorithms, such as a finite state machine, microprocessor, custom logic configured on an FPGA, and so forth. The algorithm may receive, as an input parameter, the value of the Pulse-Width-Modulator (PWM) duty-cycle integrated over a defined interval, in order to search for the optimal delay settings. However, the delays may also be fixed at specific values under control of MCU 632. PID/Error Amp 620 may correspond to error amp 416 and PID filter 402 of FIG. 5, and PWM block 622 may correspond to PWM block 404 of FIG. 5. Overlap Control block 624, PWM Integrator Filter 626, the software optimization algorithm, and Overlap Watchdog block 630 will be further discussed below.

Figure 11:
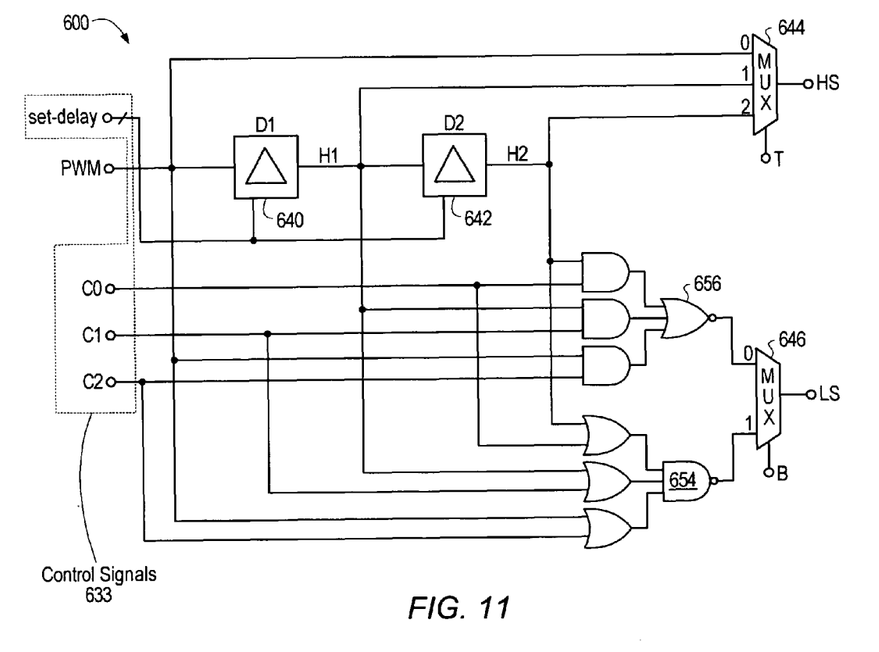
FIG. 11 is a logic diagram of one embodiment of the overlap control block shown in FIG. 10.

The basic block diagram of one embodiment of Overlap Control block 624 is circuit 600 shown in FIG. 11. Three basic inputs may be used when generating both the HS and LS gate control signals. The first input may be a PWM signal generated by PWM block 622 configured within the power regulator feedback control loop. An intermediate delayed signal H1 may be generated by running the PWM input through delay element 640, and an intermediate delayed signal H2 may be obtained from signal H1 routed through delay element 642. The output of multiplexer (MUX) 644 may be configured as the HS signal, which may be selected to have a value of PWM, H1, or H2, as determined by MUX control signal T. Thus, HS may be a delayed version of the PWM control signal, with three possible delay values: zero, D1 (as determined by delay element 640) or D1+D2 (as determined by delay elements 640 and 642). Delay elements 640 and 642 may be set via the set-delay signal(s). The output of MUX 646 may be configured as the LS signal, which may be generated by logic configured with input signals, PWM, H1, and H2. The HS-to-LS (H2L) and LS-to-HS (L2H) deadtimes may be controlled independently via input signals C0, C1, and C2, and MUX input selection via MUX control signal B. The deadtimes thus obtained may either be positive (non-overlapping), or negative (overlapping). The selected MUX inputs, delays D1 and D2, and control signals C0, C1, and C2, may be generated based on the respective signs of the desired HS-to-LS and LS-to-HS delays and their relationship. The operation of circuit 600 may be divided into six basic operating modes.

Figure 12:
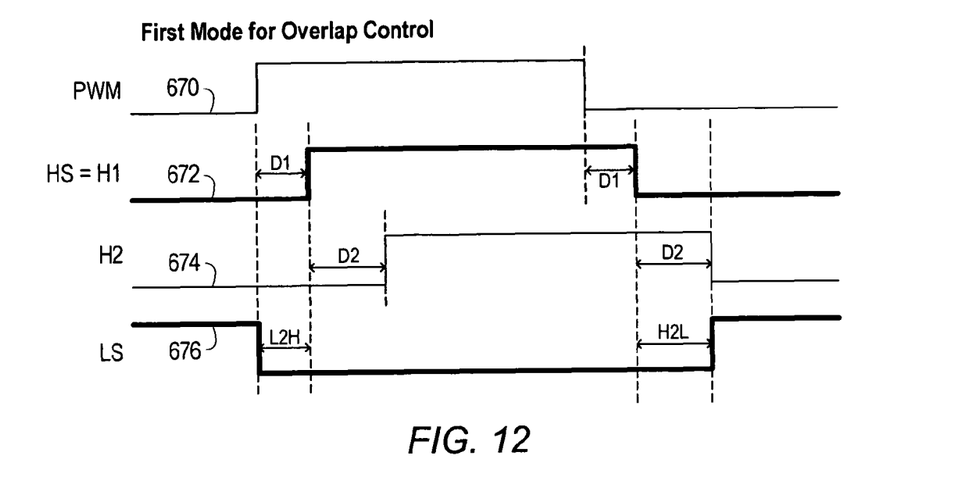
FIG. 12 is a timing diagram showing the behavior of the PWM, H1, H2, and LS signals according to a first mode of operation of the circuit shown in FIG. 11.

A first operating mode may be applicable when both deadtimes are positive, as indicated by the relationships between PWM signal 670, H1 signal 672, H2 signal 674 and LS signal 676 in FIG. 12. When positive deadtimes are desired, shown as H2L and L2H in FIG. 12, delay elements 640 and 642 may be set to L2H and H2L, respectively. HS may be generated via MUX 644, outputting the H1 signal as HS by setting MUX 644 control signal T equal to 1. LS may be generated as the output of a NOR function performed on logic inputs PWM, H1, and H2. In circuit 600, LS may be obtained by selecting the output of NOR gate 656 by setting MUX 646 control signal B to 0, while setting C0, C1, and C2 to logic '1'. Waveforms 672 and 676 illustrate the final HS and LS signals, respectively, in FIG. 12.

Figure 13:
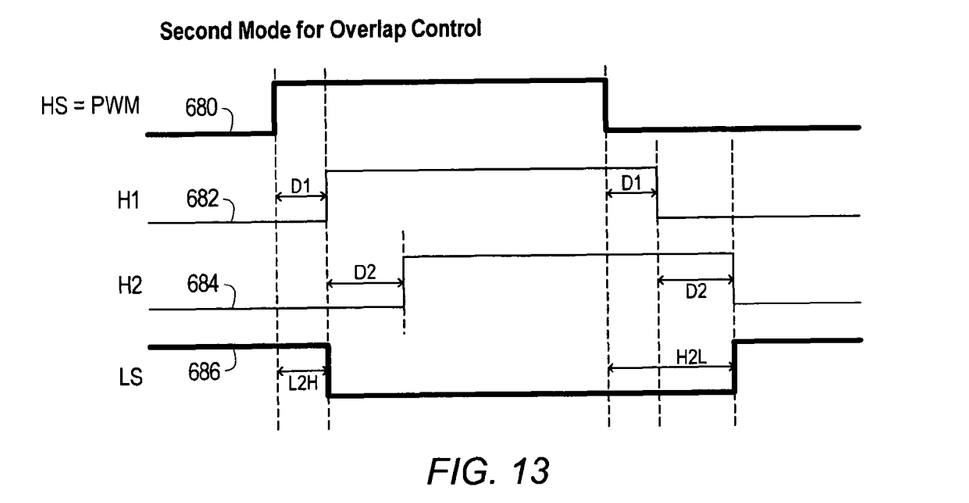
FIG. 13 is a timing diagram showing the behavior of the PWM, H1, H2, and LS signals according to a second mode of operation of the circuit shown in FIG. 11.

A second operating mode may apply when H2L≧0, L2H<0, and H2L≦−L2H, as indicated by the relationships between PWM signal 680, H1 signal 682, H2 signal 684 and LS signal 686 in FIG. 13. In this mode, delay element 640 may be set to −L2H, and delay element 642 may be set to H2L+L2H. The PWM input signal may be output as HS by setting MUX 644 control signal T to 0. LS may be obtained by selecting the output of NOR gate 656 by setting MUX 646 control signal B to 0, while setting C0 and C1 to logic '1', and C2 to logic '0'. Waveforms 680 and 686 illustrate the final HS and LS signals, respectively, in FIG. 13.

Figure 14:
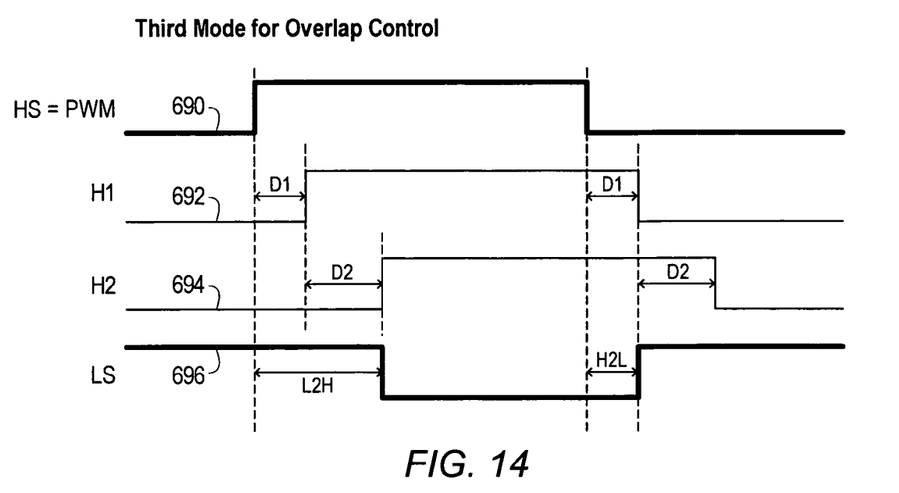
FIG. 14 is a timing diagram showing the behavior of the PWM; H1, H2, and LS signals according to a third mode of operation of the circuit shown in FIG. 11.

A third operating mode may apply when H2L>0, L2H<0, and H2L<−L2H, as indicated by the relationships between PWM signal 690, H1 signal 692, H2 signal 694 and LS signal 696 in FIG. 14. In this mode, delay element 640 may be set to H2L, and delay element 642 may be set to −(H2L+L2H). The PWM input may again be output as HS by setting MUX 644 control signal T to 0. LS may be obtained by selecting the output of NAND gate 654 by setting MUX 646 control signal B to 1, while setting C0 and C1 to logic '0', and C2 to logic '1'. Waveforms 690 and 696 illustrate the final HS and LS signals, respectively, in FIG. 14.

Figure 15:
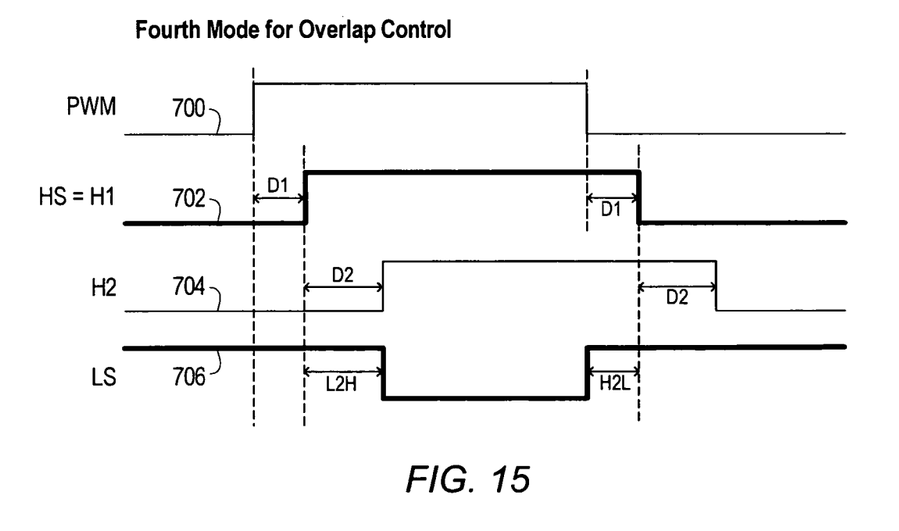
FIG. 15 is a timing diagram showing the behavior of the PWM, H1, H2, and LS signals according to a fourth mode of operation of the circuit shown in FIG. 11.

A fourth operating mode may apply when H2L<0 and L2H<0, as indicated by the relationships between PWM signal 700, H1 signal 702, H2 signal 704 and LS signal 706 in FIG. 15. In this mode, delay element 640 may be set to −H2L, and delay element 642 may be set to −L2H. The H1 signal may be output as HS by setting MUX 644 control signal T to 1. LS may be obtained by selecting the output of NAND gate 654 by setting MUX 646 control signal B to 1, while setting C0, C1, and C2 to logic '0'. Waveforms 702 and 706 illustrate the final HS and LS signals, respectively, in FIG. 15.

Figure 16:
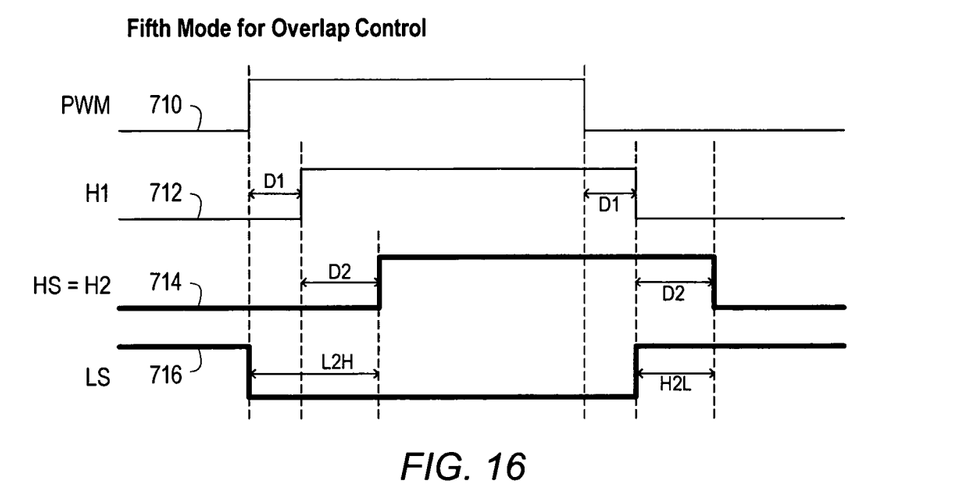
FIG. 16 is a timing diagram showing the behavior of the PWM, H1, H2, and LS signals according to a fifth mode of operation of the circuit shown in FIG. 11.

A fifth operating mode may apply when H2L<0, L2H>0, and L2H>−H2L, as indicated by the relationships between PWM signal 710, H1 signal 712, H2 signal 714 and LS signal 716 in FIG. 16. In this mode, delay element 640 may be set to L2H+H2L, and delay element 642 may be set to −H2L. In this case, the H2 signal may be output as HS by setting MUX control signal T to 2. LS may be obtained by selecting the output of NOR gate 656 by setting MUX 646 control signal B to 0, while setting C0 to logic '0', and C1 and C2 to logic '1'. Waveforms 714 and 716 illustrate the final HS and LS signals, respectively, in FIG. 15.

Figure 17:
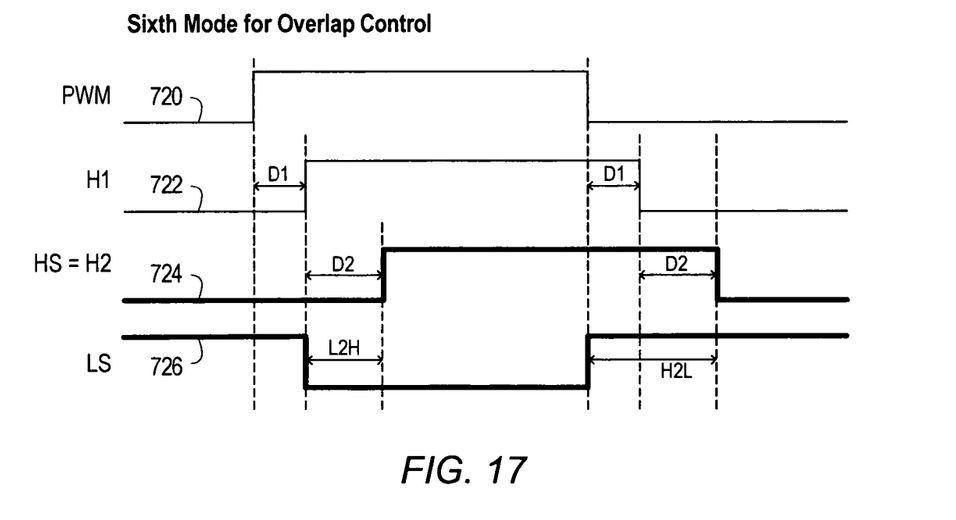
FIG. 17 is a timing diagram showing the behavior of the PWM, H1, H2, and LS signals according to a sixth mode of operation of the circuit shown in FIG. 11.

A sixth operating mode may apply when H2L<0, L2H>0, and L2H<−H2L, as indicated by the relationships between PWM signal 720, H1 signal 722, H2 signal 724 and LS signal 726 in FIG. 17. In this mode, delay element 640 may be set to −(L2H+H2L) and delay element 642 may be set to L2H. The H2 signal may again be output as HS by setting MUX 644 control signal T to 2. LS may be obtained by selecting the output of NAND gate 654 by setting MUX control signal B to 1, while setting C0 to logic '1', and C1 and C2 to logic '0'.

Referring again to FIG. 5, in one set of embodiments the efficiency of the voltage converter may be maximized by determining an optimal setting for the values of H2L and L2H. One aspect of maximizing efficiency may be to minimize the current pulled from the input—Vin applied to transistor device 408—while maintaining the desired output voltage Vout. Since the average current drawn from the input is directly related to the duty-cycle of the PWM signal, minimizing the duty-cycle while maintaining the output voltage may lead to the input power being minimized, resulting in maximized efficiency for the converter. The approximate duty-cycle required for maintaining the output voltage may be defined as the ratio of the output voltage over the input voltage (Vout/Vin). A value of 1.0 may indicate that the PWM signal is always asserted, and transistor 408 is always enabled. A value of 0.0 may indicate that PWM is always de-asserted, and transistor 410 is always enabled. The average duty-cycle may be slightly larger than the approximate value in order to correct for circuit losses due to parasitic resistances, transistor cross-conduction, or body-diode conduction.

Figure 18:
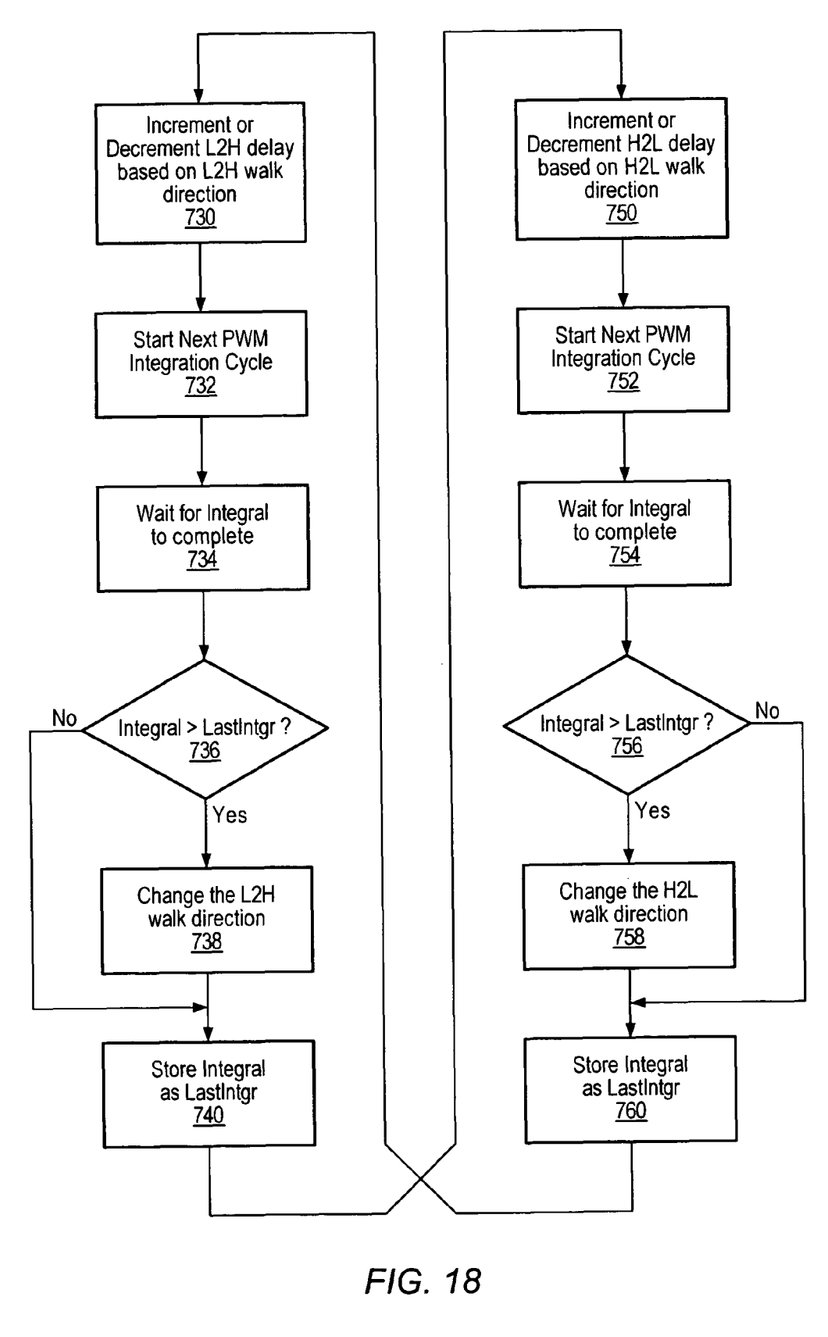
FIG. 18 is a flowchart showing one embodiment of an algorithm that may be executed to monitor the PWM duty-cycle over long periods of time and search for the values of H2L and L2H that minimize the PWM duty-cycle value.

A software algorithm may be devised to allow monitoring of the PWM duty-cycle over long periods of time and searching for the values of H2L and L2H that minimize the PWM duty-cycle value. Preferred embodiments may be configured to continually optimize the deadtimes, interleave the optimization of the H2L and L2H delays, and avoid sub-optimal solutions due to local minima. A flowchart for one embodiment of the basic algorithm is shown in FIG. 18. The two deadtime delays may be incremented by small amounts (730 and/or 750), and a PWM integration cycle may be performed with the new deadtime values (732-734 and/or 752-754) until either a specified minimum/maximum delay is reached or the magnitude of the integral PWM duty-cycle increases (736 and/or 756). If either event occurs, the algorithm may change direction (738 and/or 758) before storing the integral of the PWM duty-cycle value as the last integral value (740 and/or 760). For example, if the H2L deadtime was gradually increasing and the PWM duty-cycle was observed to increase, the algorithm may begin to gradually decrease the H2L deadtime delay until either the PWM duty-cycle begins to increase or the H2L deadtime delay reaches a predefined limit. Thus, the algorithm may eventually search out the delay, either H2L and/or L2H, which provides the minimum PWM duty-cycle. This may be performed when the duty-cycle vs. deadtime relationship exhibits a single minima point.

The algorithm may operate to optimize each delay (H2L and L2H) independently by alternating between deadtime updates. For example, the left column (730-740) of the algorithm flow chart shown in FIG. 18 may represent one cycle during which the L2H deadtime delay may be monitored/adjusted. As mentioned above, the PWM duty-cycle may be integrated over a predefined period (732-734), and its total integral over this period may be compared to the integral of the PWM duty-cycle value saved from the previous cycle (736). If the value decreases, the delay may continue to walk in the same direction, but not until the next integration cycle, which may occur after the integration cycle for H2L (752-754) has completed. If the value increases, the direction may be reversed (738). As shown, the H2L delay may be monitored/adjusted the next cycle, as represented by the right column (750-760) of the flow chart shown in FIG. 18. By interleaving in this manner, any change in each integral value of the PWM duty-cycle may depend only on the delay updated at the beginning of the integral period, thereby allowing the H2L and L2H deadtime delays to be optimized independently of one another. It should be noted that the ability to continually optimize the two deadtime delays may improve noise immunity, providing a means for tracking changes with temperature, input changes, and load changes.

In some cases the relationship between the average duty-cycle and a deadtime value may have multiple minima. Under certain conditions, the algorithm shown in FIG. 18 may settle on a minimum deadtime delay value even when a more optimal solution may exist. This may be addressed by introducing an occasional pseudo-random "hop" in a deadtime value. For example, every 100 walk cycles, a randomly generated signed value may be added to each deadtime delay. This random hop may push a deadtime value out of a local minimum and allow the algorithm to settle to a better solution. In such cases, the maximum allowed random value may be chosen to be small enough to reduce the likelihood of the algorithm actually being forced away from a true optimal solution. In one set of embodiments, this issue may be addressed by monitoring/adjusting each deadtime delay between the minimum and maximum allowed values first. The algorithm may be configured to return to the value that resulted in the smallest PWM integral value, and continue monitoring/adjusting according to the flowchart shown in FIG. 18. This may lead to performing a wide search to find the global minima, then performing the algorithm (shown in FIG. 18) to track this minima over changes in operating conditions. In other embodiments, the algorithm may be configured to hold either the H2L or L2H deadtime delay fixed while optimizing the other. This may be desired for non-standard applications where the duty-cycle vs. deadtime relationship is poorly defined for a given delay.

Figure 19:
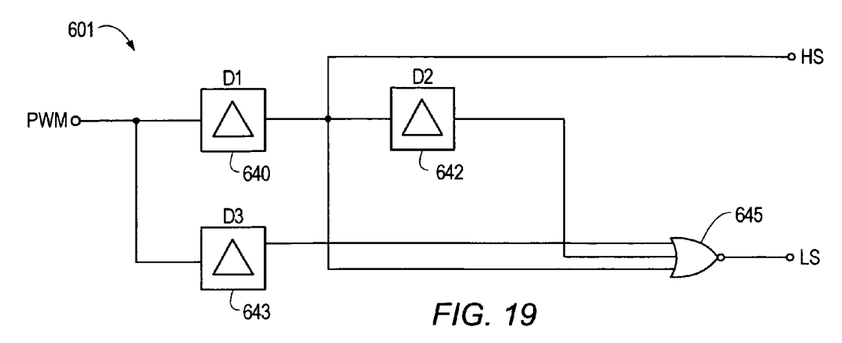
FIG. 19 is a partial logic diagram of an alternative embodiment of the overlap control block shown in FIG. 10.

Referring again to FIG. 11, it should be noted that as the value of delay element 640 (D1) is changed, for example according to the optimization algorithm shown in FIG. 18, the period of the HS signal may be disturbed for a single switch cycle. This disturbance may result in a slight deviation in the output of a power converter configured to receive HS and LS control signals from circuit 600. An alternative circuit 601, shown in FIG. 19, may provide an improvement with the addition of a third programmable delay element 643. Circuit 601 is simplified and only shows how positive overlap values may be generated, consistent with the first operating mode for circuit 600 described above. Those skilled in the art will appreciate that circuit 601 may be configured to implement the other operating modes previously described, and may be operated according to the algorithm shown in FIG. 18, among others. In circuit 601, delay element 640 may be controlled to provide a delay equal to the largest L2H value that may be required for a given application. After delay element 640 has been set, it may remain unchanged during subsequent deadtime optimization, while delay elements 642 and 643 may be allowed to change. This may provide deadtime control as described for circuit 600 and the algorithm shown in FIG. 18, but without disturbing the resulting output voltage.

Figure 20:
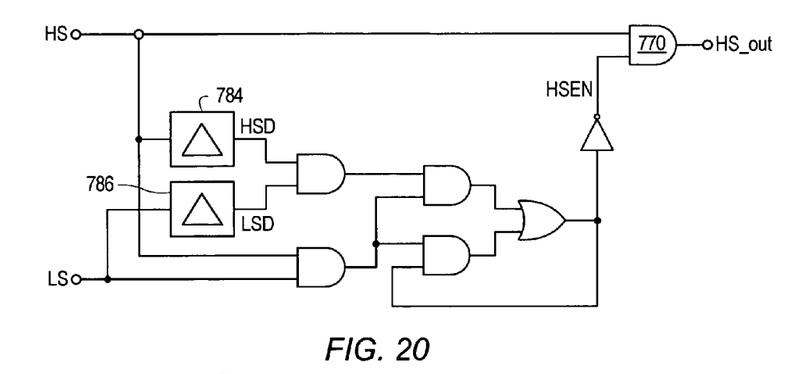
FIG. 20 is a logic diagram of one embodiment of an Overlap Watchdog Circuit configured to further control the HS and LS outputs.
Figure 21:
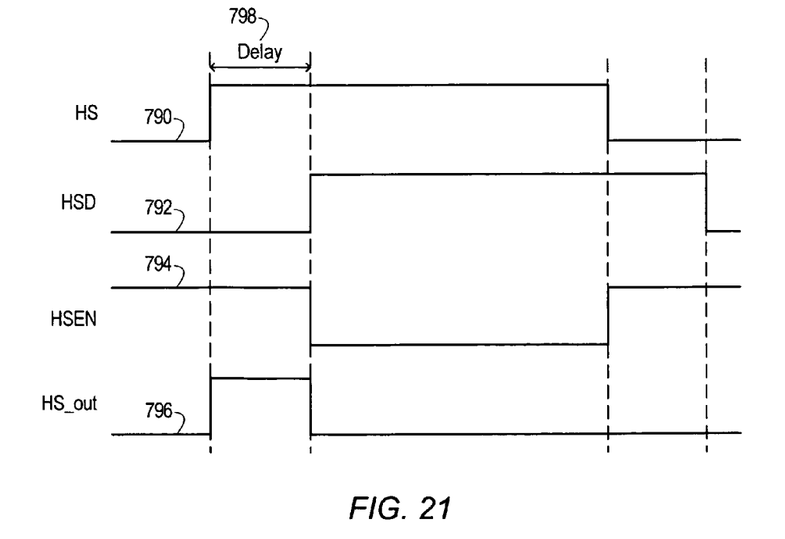
FIG. 21 is a timing diagram showing the behavior of the HS, HSD, HSEN, and HS_out signals according to the operation of the Overlap Watchdog Circuit shown in FIG. 20.

Referring now to FIGS. 5, 10, 11 and 19, when attempting to optimize the deadtime between power transistors 408 and 410, damage may occur if the transistors are allowed to cross-conduct for a significant period of time. In certain embodiments, in order to protect against errors by MCU 632 or any associated hardware, an Overlap Watchdog Circuit may be configured to further control the HS and LS outputs generated by circuit 600 and/or circuit 601. One embodiment of such an Overlap Watchdog Circuit is illustrated in FIG. 20. The circuit may monitor the requested state of transistors 408 and 410 generated, for example, by circuit 600. If both HS and LS are asserted for a period that exceeds delay 784 and/or delay 786, the HS signal may be output by AND gate 770 as transistor 408 control signal HS_out, which may be disabled until one of the control inputs HS and/or LS is de-asserted. A timing diagram showing the behavior of signals HS, HSD, HSEN, and HS_out during operation of circuit 601 according to one embodiment is shown in FIG. 21. In the embodiment shown, HS 790 asserts when LS is already asserted, and HS_out 796 is allowed to assert for a time period up to the delay period 798, after which it is forced to de-assert until HS 790 returns to a low value. This may permit small overlaps to be generated for efficiency optimization without risking excess cross-conduction that could damage transistors 408 and 410.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A circuit for controlling overlap timing between two signals, the circuit comprising:
   a first subcircuit configured to:
      receive an average value of a control parameter, wherein the average value of the control parameter was computed from instantaneous values of the control parameter over a defined interval;
      determine desired delay settings based on the average value of the control parameter, wherein the desired delay settings correspond to a minimum value of the control parameter; and
   a second subcircuit configured to:
      generate, based on the desired delay settings, desired time delays between at least two gate control signals; and
      assert the two gate control signals according to the desired time delays and the control parameter, wherein the two gate control signals are configured to control corresponding respective devices in a power regulator.

2. The circuit of claim 1, further comprising a third subcircuit configured to receive at least the two gate control signals and generate an updated gate control signal corresponding to one of the two gate control signals, wherein the third subcircuit is configured to:
   output the updated gate control signal to control the respective device corresponding to the one of the two gate control signals; and
   limit a time period during which both the updated gate control signal and the other one of the two control signals are asserted.

3. The circuit of claim 2, wherein, if the updated gate control signal and the other one of the two control signals are both asserted, the third subcircuit is configured to de-assert the updated gate control signal after a specified time delay.

4. The circuit of claim 1, further comprising a PWM (pulse width modulator) circuit configured to generate a PWM signal, wherein the control parameter is a duty-cycle of the PWM signal.

5. The circuit of claim 4, further comprising an integrator circuit configured to receive the PWM signal and configured to compute the average value of the PWM duty-cycle value over the defined interval.

6. The circuit of claim 1, wherein the first subcircuit is configured to determine the desired delay settings by executing an algorithm adapted to determine the minimum value of the control parameter based on a ratio of an output voltage of the power regulator to an input voltage of the power regulator, and calculate the desired delay settings according to the determined minimum value of the control parameter.

7. A system for controlling a switching power regulator configured to provide a target voltage based on an input voltage, the system comprising:
   a microcontroller configured to receive an average value of a control parameter of a main control signal, wherein the average value of the control parameter of the main control signal was computed from instantaneous values of the control parameter over a specified period of time, and determine desired delay settings based on the average value of the control parameter of the main control signal; and an overlap control circuit configured to receive the desired delay settings, based on the desired delay settings generate desired time delays between at least two gate control signals, and assert the two gate control signals according to the desired time delays and the main control signal;

wherein the two gate control signals are configured to control corresponding respective transistor devices in a power regulator.

8. The system of claim 7, wherein the microcontroller is configured to execute an algorithm configured to determine delay settings that correspond to a specified value of the control parameter of the main control signal, wherein the desired delay settings are the delay settings that correspond to the specified value of the control parameter of the main control signal.

9. The system of claim 8, wherein the specified value of the control parameter of the main control signal corresponds to a minimum input power consumed by the switching voltage regulator while providing the target voltage.

10. The system of claim 7, wherein the overlap control circuit comprises:
  a first delay element configured to receive a set-delay value from the microcontroller and further configured to receive the main control signal, wherein the first delay element is configured to determine a first time period based on the set-delay value, and delay the main control signal by the first time period, thereby producing a once delayed main control signal; and
  a second delay element configured to receive the set-delay value and further configured to receive the once delayed main control signal, wherein the second delay element is configured to determine a second time period based on the set-delay value, and delay the once delayed main control signal by the second time period, thereby producing a twice delayed main control signal;
  wherein the overlap control circuit is configured to output as one of the two gate control signals either the main control signal or the once delayed main control signal or the twice delayed main control signal.

11. The system of claim 10, wherein the overlap control circuit further comprises a first logic block configured to generate a first intermediate control signal and a second intermediate control signal based on the main control signal, the once delayed main control signal, the twice delayed main control signal, and first, second, and third control values received from the microcontroller;
  wherein the overlap control circuit is configured to output as the other of the two gate control signals either the first intermediate control signal or the second intermediate control signal; and
  wherein different combinations of the first, second, and third control values determine respective corresponding overlapping characteristics of the two gate control signals.

12. The system of claim 10, wherein the overlap control circuit further comprises:
  a third delay element configured to receive the set-delay value and further configured to receive the main control signal, wherein the third delay element is configured to determine a third time period based on the set-delay value, and delay the main control signal by the third time period, thereby producing an alternate delayed main control signal; and
  a first logic block configured to generate a first intermediate control signal and a second intermediate control signal based on the alternate delayed main control signal, the once delayed main control signal, the twice delayed main control signal, and first, second, and third control values received from the microcontroller;
  wherein the overlap control circuit is configured to output as the other of the two gate control signals either the first intermediate control signal or the second intermediate control signal; and
  wherein different combinations of the first, second, and third control values determine respective corresponding overlapping characteristics of the two gate control signals.

13. The system of claim 12, wherein the first delay element is configured to keep the first time period unchanged after first determining the first time period.

14. The system of claim 13, wherein the second delay element and the third delay elements are configured to determine the second time period and the third time period, respectively, for each received set-delay value.

15. The system of claim 7, further comprising an overlap watchdog circuit configured to receive the two gate control signals and configured to disable one of the two gate control signals when both gate control signals have been simultaneously asserted for at least a specific time period.

16. The system of claim 15, wherein the overlap watchdog circuit comprises:
  a pair of delay elements, each of the pair of delay elements configured to delay a respective one of the two gate control signals by the specific time period; and
  an enable signal based on the gate control signals and the delayed gate control signals, wherein the overlap watchdog circuit is configured to use the enable signal to enable the one of the two gate control signals.

17. A circuit for controlling a switching power regulator, wherein a first portion of the circuit is configured to determine desired delay settings based on an average value of a control parameter of a main control signal, and wherein a second portion of the circuit is configured to generate, based on the desired delay settings, desired time delays between at least two gate control signals, and assert the two gate control signals according to the main control signal and the desired time delays;
  wherein each of the two gate control signals is configured to control a corresponding respective device in a power regulator;
  wherein the average value of the control parameter was computed from instantaneous values of the control parameter over a time interval of specified length.

18. The circuit of claim 17, wherein a third portion of the circuit is configured to compute the average value of the control parameter over the time interval of specified length.

19. The circuit of claim 18, wherein the desired delay settings correspond to a minimum power consumed by the switching voltage regulator as the switching voltage regulator provides a specified output voltage.

20. The circuit of claim 18, wherein the first portion of the circuit is configured to execute an algorithm to determine the desired delay settings, wherein the desired delay settings comprise a first delay value and a second delay value, wherein the first delay value corresponds to a delay between a first one of the two gate control signals de-asserting and the second one of the two gate control signals asserting, wherein the second delay value corresponds to a delay between the second one of the two gate control signals de-asserting and the first one of the two gate control signals asserting, wherein the algorithm comprises:

(a) setting the first delay value to an initial value and the second delay value to an initial value;

(b) setting a first walk direction, wherein the first walk direction indicates whether the first delay value is to be increased or decreased, and setting a second walk direction, wherein the second walk direction indicates whether the second delay value is to be increased or decreased;

(c) storing an initial average value of the control parameter;

(d) incrementing or decrementing the first delay value according to the first walk direction;

(e) starting a computation cycle and waiting for the computation cycle to complete, wherein the computation cycle comprises the third portion of the circuit computing the average value of the control parameter over the time interval of specified length;

(f) changing the first walk direction if the average value of the control parameter is greater than a most recently stored average value of the control parameter;

(g) storing the average value of the control parameter;

(h) incrementing or decrementing the second delay value according to the second walk direction;

(i) starting a computation cycle and waiting for the computation cycle to complete, wherein the computation cycle comprises the third portion of the circuit computing the average value of the control parameter over the defined time interval;

(j) changing the second walk direction if the average value of the control parameter is greater than a most recently stored average value of the control parameter; and (k) storing the average value of the control parameter.

21. The circuit of claim 20, wherein the algorithm further comprises performing (d)-(k) a plurality of times.

22. A method for controlling deadtimes between two gate control signals used for controlling output transistors in a switching power regulator configured to provide a target voltage, the method comprising:

computing an average value of a control parameter of a main control signal from instantaneous values of the control parameter over a specified period of time;

determining desired delay settings based on the computed average value of the control parameter;

generating desired time delays between the two gate control signals, according to the determined desired delay settings; and asserting the two gate control signals according to the main control signal and the generated desired time delays.

23. The method of claim 22, wherein said determining the desired delay settings comprises searching for delay settings that minimize a value of the control parameter of the main control signal, wherein the minimized value of the control parameter corresponds to a minimum current conducted by the switching power regulator as the switching power regulator provides the target voltage.

24. The method of claim 22, wherein the main control signal is a PWM (Pulse Width Modulated) signal, wherein the control parameter is a duty-cycle value of the PWM signal.

25. The method of claim 22, wherein said computing the average value of the control parameter comprises integrating a value of the control parameter over the specified period of time.

26. The method of claim 22, wherein said generating the desired time delays comprises adjusting one or more delay elements to delay the main control signal by respective time periods that are based on the desired delay settings.

* * * * *